United States Patent [19]
Smith

[11] 3,743,399
[45] July 3, 1973

[54] MICROFORM READER COVER PLATE OPENING MECHANISM
[75] Inventor: Stephen B. Smith, Centerville, Ohio
[73] Assignee: The National Cash Register Company, Dayton, Ohio
[22] Filed: July 21, 1971
[21] Appl. No.: 164,571

[52] U.S. Cl. .................................... 353/23, 353/27
[51] Int. Cl. ..................... G03b 21/14, G03b 23/08
[58] Field of Search ..................... 353/27, 74–78, 353/22, 23, 24

[56] References Cited
UNITED STATES PATENTS
3,413,061 11/1968 Simpson ............................... 353/27
3,442,581 5/1969 Smitzer ................................ 353/27

Primary Examiner—Louis R. Prince
Assistant Examiner—A. J. Mirabito
Attorney—J. T. Cavender, Wilbert Hawk, Jr. et al.

[57] ABSTRACT

A mechanism for automatically opening the cover plate of a microform reader. The mechanism includes a spring-loaded toggle member riding on the cover glass and engageable with a slot portion of the cover glass to lift the glass for insertion and/or removal of a microform. The toggle member has a self-locking feature which prevents closing of the cover glass until it is moved rearwardly to rotate the toggle member.

12 Claims, 5 Drawing Figures

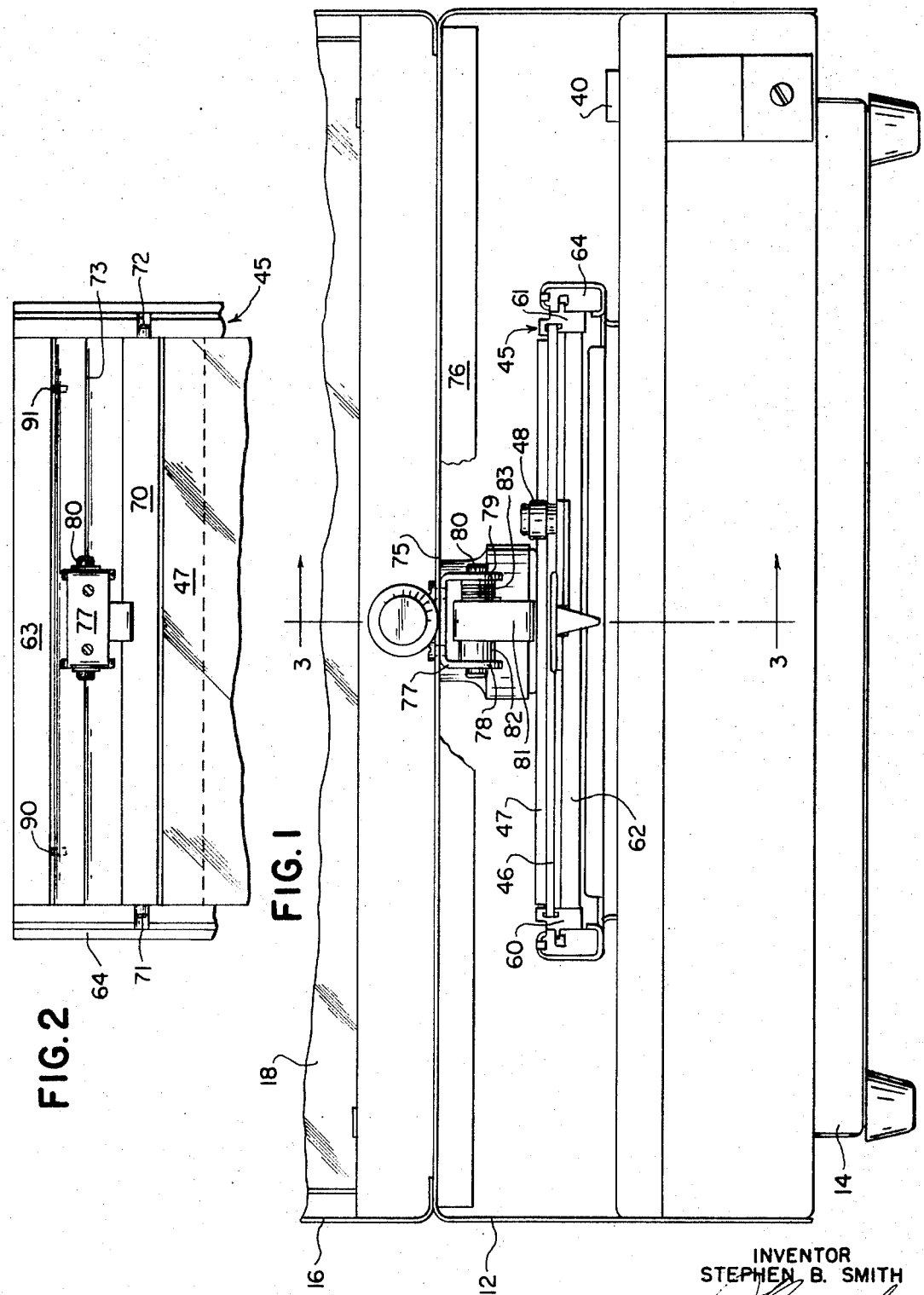

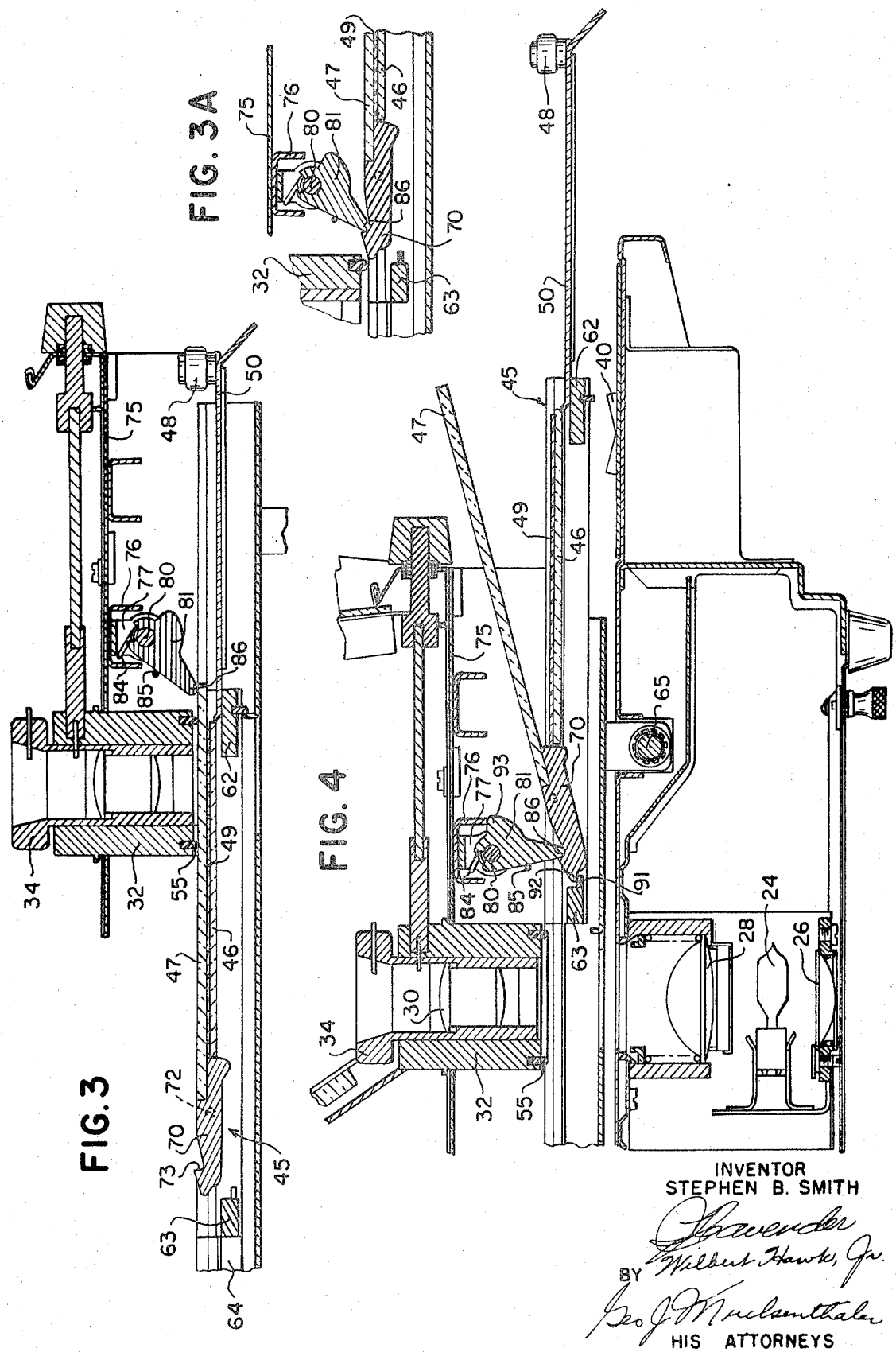

MICROFORM READER COVER PLATE OPENING MECHANISM

BACKGROUND OF THE INVENTION

There is usually provided, in the recent microform readers, some means for opening the glass cover or top plate (as it is sometimes called) to allow for easy and simple insertion and removal of the microform. As is well-known, the reader has a microform carrier which is movable in a side-to-side direction and in a fore-and-aft direction for the purpose of selecting a frame on the microform which is desired to be viewed on the screen. Generally, the carrier comprises a lower glass plate which is secured to a frame, in turn movable along rails, shafts, or the like, and an upper glass plate which is pivotable at the rear thereof for readily inserting or removing the microform. The upper or cover glass, as the name implies, covers the microform and holds it in a flat condition between the plates while the reader is being used.

When it is desired to insert or remove a microform, the carriage is pulled in the forward direction and the cover glass is caused to be lifted at the front thereof for easy access to the space between the plates, the rear of the glass being pivoted on pins carried on the frame. Generally, means for automatically lifting the cover glass is by way of a camming or gearing arrangement wherein the glass plate bears against an inclined surface as the carriage is pulled forward to a plate open position. However, the lens arrangement of the reader itself may control to some extent the type mechanism and method used to open such top plate.

Considering known cover glass opening mechanisms, U.S. Pat. No. 2,326,042, on the application of G. Lessman, shows a card carriage with upper and lower glass plates, a pair of hinge plates hinged on a common pin, with the upper plate having a handle biased by a leaf spring to resist deflection of the handle.

A film holder is shown in U.S. Pat. No. 2,353,241, on the application of C. J. Hughey, which holder has glass plates operated by a handle to lift the top plate, the handle having a recess therein for receiving a spring-loaded ball to releasably hold the lever in top plate-elevated position.

A plate carrier assembly is shown in U.S. Pat. No. 2,701,979, on the application of V. E. Pratt et al., which assembly has a locking device to maintain pressure on the top plate when closed, and which uses a cam plate and spring-loaded bell cranks in the operation of inserting or removing a record sheet.

Additional prior art in U.S. Pat. No. 3,188,910, on the application of P. J. Brownscombe et al., shows a U-frame with fixed pins for pivoting action, the pins being connected by tension springs to provide a toggle action for holding the U-frame in a raised position and also in a lowered position.

Another means of operating the top plate is shown in U.S. Pat. No. 3,224,326, on the application of P. J. Brownscombe, by the use of spring clasps at the sides of the plate to hold the plate in raised position when inserting or removing a microfilm.

U.S. Pat. No. 3,413,061, issued on the application of L. E. Simpson et al., uses a roof portion of the housing and a spring projection to raise the top plate when the transparent carrier platform is moved forward.

Automatic pivoting of the top plate is accomplished, in U.S. Pat. No. 3,424,524, issued on the application of H. Akiyama et al., by downward pressure of the projection lens assembly on the rear of the top plate when it is pulled forward.

Furtherprior art Further prior shown in U.S. Pat. No. 3,442,581, on the application of L. A. Smitzer et al., wherein an arm on the top plate engages a hook to raise the plate when it is moved forward.

Finally, U.S. Pat. No. 3,446,552, to M. C. Gross et al., shows a holder frame movable into an access opening to open a pivoted door which action serves to actuate a camming device with spring arms for camming the plates apart.

While the above prior art treats the subject matter in various ways, it is desirable to have a cover opening mechanism which is simple, reliable and adaptable for different lens systems.

SUMMARY OF THE INVENTION

The present invention relates to microform readers and more particularly to means for automatically lifting the top or cover glass plate for easy insertion and/or removal of a microform. As is well-known in the field of microform systems, the microform carrier includes a framework carrying a lower and an upper glass plate, the plates being arranged so that in the closed position, they are substantially flat or level with respect to each other, and in the open position, one of the plates is inclined at an angle with respect to the other to present a space between them for insertion and/or removal of the microform. Generally, the microform carrier is moved forwardly to present the glass plates and the microform in accessible manner, and, of course, it is desirable to have mechanism which automatically opens up the space between the plates upon such movement of the carrier. In the present invention, a toggle mechanism is securely positioned above the cover glass plate and extends downwardly to continuously engage with the cover plate as the microform carrier is moved about in the operation thereof. The mechanism includes a toggle arm journaled on a pin, in turn, carried in a U-shaped support member which is secured to the reader frame. A torsion spring, surrounding the pin and connected with the toggle arm and with the support member, biases the arm in one direction of rotation but allows the arm to swing in the other direction. The cover plate has pins secured at the sides thereof for pivoting and has an elongated recess at the rear for engagement by the toggle arm when the carrier is moved to a forward position. The toggle arm also includes an abutment thereon which engages with the U-shaped support to stop rotation of the arm upon engagement thereof with the cover plate recess. The carrier frame has a pair of stop pins thereon engageable by the cover plate when it is in a raised position to limit the extent of travel thereof and when the plate is in such position, the forces are directed to retain or lock the plate in the raised position.

In accordance with the above discussion, the principal object of the present invention is to provide a plate opening mechanism for easy insertion and/or removal of a sheet of material.

Another object of the present invention is to provide a toggle mechanism for opening a cover plate which mechanism allows for riding of a projection lens on the cover plate.

A further object of the present invention is to provide a toggle mechanism for opening a cover plate which allows for such opening when the projection lens is not in contact with the cover plate.

An additional object of the present invention is to provide a toggle mechanism for opening the cover plate and for maintaining the plate in an open position during insertion and/or removal of the material.

Additional advantages and features of the present invention will become apparent and fully understood from a reading of the following description taken together with the annexed drawings, in which:

FIG. 1 is a front elevational view of a lower fragmentary portion of a microform reader incorporating the structure of the present invention;

FIG. 2 is a top plan view of a portion of the microform carrier of such a reader of FIG. 1 and showing the cover plate toggle mechanism;

FIG. 3 is a view in section taken generally along the lines 3—3 of FIG. 1 showing the microform carrier in a rearward position with the projection lens assembly and the arm of the toggle mechanism riding on the cover plate;

FIG. 3A is a view in section showing the arm of the toggle mechanism in engagement with the recess of the cover plate prior to opening thereof; and FIG. 4 is a similar view as FIG. 3 except with the microform carrier in a forward position and wherein the toggle arm is engaged with the recess in the cover plate for opening the plate for insertion and/or removal of a microform.

Referring to FIG. 1, the reader illustrating the present invention has a lower housing 12 for enclosing required framework supported by a base 14, while an upper housing 16 (partially shown) encloses a glass viewing screen 18 (also partially shown), the screen extending upwardly at an angle to provide a suitable reading surface for the operator or user of the reader. As is well-known, a microform reader basically has a microform image holder or carrier, a projection lens and optical system, and, of course, the screen for viewing an enlargement of a microimage. The details of the projection lens and optical system form no part of the present invention, however, suffice it to say that the optical system includes a source of light 24 (FIG. 4), a reflector 26, a converging lens 28, and a projecting lens 30 and holder 32 therefor. The projecting lens 30 seats in an adapter 34 which may vary to accommodate lenses of different size for the holder 32. Certain features of the instant reader are similar to features more fully shown and described in a co-pending U.S. application, Ser. No. 851,858, filed Aug. 21, 1969, in the names of Arnis E. Peters and Lyle G. Miles, and which application is assigned to the same assignee as the application of the present invention.

The light source 24 is included in a suitable circuit (not shown) and is controlled by an on-off switch 40 (FIG. 4). The light rays are directed upwardly through the converging lens 28, through a selected microimage on the microform and projected through the lens 30 to a system of mirrors (not shown) and onto the screen 18 for viewing of the enlarged image thereon.

Provision is made in the reader to readily load and unload a microform selected to be read and this generally is in the nature of a microform carrier which is drawn forward or toward the operator to insert the form and is then pushed rearwardly to position the form for reading, after which the carrier is again pulled forward to remove the microform therefrom. In the instant invention, the microform carrier comprises a framework 45 supporting a lower glass or like transparent plate 46 (see FIGS. 3 and 4), an upper glass or like transparent plate 47, and a handle 48 for use by the operator in moving the carrier to desired fore-and-aft and side-to-side positions, with a microform 49 nestled or sandwiched between the transparent plates 46 and 47. The handle 48 is secured to an extension 50 of the carrier framework 45 so that the carrier itself is movable as a unit in the required directions to position the microform 49 in the desired location for viewing a selected microform thereon. The microform carrier moves along tracks, rails, or shafts in well-known manner to direct a desired image on the microform in position over the light source for projection of the image. The cover or upper transparent plate 47 is pivotable to allow for easy insertion and/or removal of the microform. When a microform is placed between the upper and lower plates 47, 46 (as in FIG. 3), the form is held in an even and smooth condition to permit the projection lens 30 to see the selected image and to pick up the image in a flat plane, so as to present a clear projection of the image onto the screen 18. The projection lens holder 32 normally rides on the upper transparent plate 47 through a tracking ring 55 secured to the holder 32 and which ring is maintained in contact with and glides over the top surface of the upper plate as the microform carrier 45 is moved about by handle 48 during the selection of an image to be viewed.

As mentioned above, provision is made for easy loading and unloading of the microform 49. As seen in FIGS. 3 and 4, the lower glass plate 46 is fixed in relation to the framework of the carrier 45 so as to present a flat surface for the microform. Both plates 46 and 47 are supported and contained by rails 60 and 61 (FIG. 1) connected at the front by a cross bar 62 and at the rear by a tie bar 63 (FIG. 4), the rails being slidable along a carrier assembly 64 which moves in the side-to-side direction along suitable rods or shafts (one such shaft 65 being shown in FIG. 4). The microform carrier 45 is movable at the same time in the fore-and-aft direction so as to obtain additionally the diagonal movement of the microform in rapidly selecting an image thereon.

The upper glass plate 47 is secured at the rear edge thereof to a hinge plate 70 which fits inside the rails 60 and 61, the plate 70 having pivot pins 71 and 72 (FIG. 2) secured thereto for riding in slots in the rails so that the plate pivots in the manner as shown in FIG. 4. Hinge plate 70 has an elongated recess 73 across the rear portion thereof for purposes to be described. Secured to a reader frame plate 75 above the glass plate 47 is a channel member 76 (FIGS. 3 and 4) extending substantially across the width of the reader and which supports a U-shaped bracket 77 having sides 78 and 79 (FIG. 1) projecting downwardly. A pivot pin or like member 80 is journaled in such sides 78, 79 and carries a rockable toggle arm 81 thereon (FIG. 4), with a spacing sleeve 82 and a torsion spring 83 on the member 80 adjacent the arm 81 (see also FIG. 1). Spring 83 has one end 84 (FIGS. 3 and 4) thereof in abutment with the side 79 of such bracket 77 and the other end 85 in abutment with a side of the toggle arm 81 to provide a counter-clockwise bias to such toggle arm, as seen in FIG. 4, for maintaining a tip portion 86 of such arm 81 in contact with the top surface of upper glass plate 47. As seen in FIG. 2, the rear tie bar 63 has a pair of spaced limit pins 90 and 91 engageable by a lip portion 92 of the hinge plate 70 (see also FIGS. 3 and 4), and the toggle arm 81 has a forward projecting portion 93 engageable with one leg of the support channel 76 when the upper plate 47 is in the open position (FIG. 4).

The normal positions of such parts are shown in FIG. 3 wherein the microform carrier 45 is in a rearward position, there being a microform 49 between the upper 47 and lower 46 plates, and wherein the lens holder tracking ring 55 and the toggle arm 81 ride on the upper surface of the upper plate 47. The carrier 45 is moved by means of handle 48 to select the desired image or images on the microform to be read on the screen 18. When it is desired to remove a microform 49, the handle 48 is pulled forwardly or to the right, as in FIG. 4, whereupon the microform carrier 45 is pulled from under the lens holder 32 and the toggle arm tip portion 86 enters the recess 73 of the hinge plate 70, as shown in FIG. 3A. At this point in time, the toggle arm 81 has pivoted counter-clockwise a slight amount by reason of tip portion 86 entering the recess 73, and which engagement stops forward movement of the carrier 45. Upon such entry the toggle arm 81 remains positioned as shown in FIG. 3A, however, a slight additional movement of the microform carrier 45 in the forward direction causes the toggle arm 81, through movement of the plate 70, to bear against the recess and to rock counter-clockwise a further amount on its pivot pin 80 and thereby force the rear of the hinge plate 70 downwardly, in turn pivoting the upper plate 47 to an open position, as in FIG. 4. Forward movement of the carrier 45 is limited by the combined engagement of the hinge plate lip portion 92 with the limit pins 90, 91 and of the toggle arm portion 93 with the one leg of the support channel 76. With the parts in this position (FIG. 4), the force line is substantially vertical through the center of the support pin 80 and arm 81 with the upper plate 47 being thereby held or locked automatically in the open position for removal and/or insertion of another microform, after which a slight inward push on the handle 48 moves the carrier 45 rearwardly whereupon the toggle arm 81 is caused to be rotated clockwise permitting the top plate 47 to automatically return to its closed position.

It is thus seen that herein shown and described is a cover plate opening mechanism which operates to automatically pivot the upper glass plate of a microform reader to an open position for insertion and/or removal of a microform and which accomplishes the objects and advantages hereinabove. While only one embodiment of the invention has been disclosed herein, certain variations may of course occur to those skilled in the art and it is contemplated that all such variations not departing from the spirit and scope of the invention hereof are to be construed in accordance with the following claims.

What is claimed is:

1. An opening mechanism for a pair of microform carrier plates movable in fore-and-aft manner in a microform reader, one of the plates being fixed to the carrier and the other being pivotable along one edge thereof in relation to the fixed plate to enable insertion and removal of the microform, said mechanism comprising arm means rockably supported from the reader and with the free end thereof engaging with the surface of the pivotable plate, said pivotable plate having a hinge portion thereon along said edge extending from the pivot in a direction opposite to said plate, said hinge portion having a recess therein, and means on the arm means engagable with a stop means on the reader for limiting rockable movement of the arm means after movement of the plates in the forward direction, said arm means bearing against the pivotable plate and into the hinge portion recess for causing opening of said pivotable plate.

2. The mechanism of claim 1 including means urging said arm means into continuous engagement with the pivotable plate.

3. The mechanism of claim 1 including a support member carried by the reader and wherein the arm means is a toggle member rockably supported from the support member.

4. The mechanism of claim 1 wherein said stop means on the reader is engageable by the pivotable plate hinge portion for limiting pivotable travel of said plate.

5. The mechanism of claim 1 wherein the means on the arm means engagable with said stop means on the reader is an abutment for limiting rotation of the arm means to a position wherein the line of force exerted upon the toggle arm by the pivotable plate is directed toward the center of the pivot connection to retain the pivotable plate in an open position.

6. In a reader, a microform carrier having a frame, an upper and a lower plate slidable with the frame in a fore-and-aft direction, said lower plate being fixed to said frame, and means for pivotally opening the upper plate from the lower plate for insertion and removal of a microform when moving the plates in the forward direction, said means comprising a support member secured to the reader in a position above the plates, and toggle means pivotally supported from the support member and having an arm the free end thereof being engagable with the surface of the upper plate, said upper plate being pivotable along the rear edge thereof, said rear edge having a recess therein, said arm entering the recess upon movement of the carrier in a forward direction and pivoting said toggle means to bear against said recess whereby the upper plate is pivoted to separate the upper from the lower plate.

7. In the reader of claim 6 wherein said toggle means includes a torsion spring for biasing said arm in continued engagement with said upper plate and for directing said arm into said recess upon forward movement of the plates.

8. In the reader of claim 6 wherein said toggle means includes an abutment thereon engageable with the reader frame for limiting rotation of the toggle means upon forward movement of the microform carrier and upon the bearing of said arm into said recess for pivoting of the upper plate.

9. In a microform reader having a frame, a microform carrier containing an upper and a lower glass plate and movable in fore-and-aft manner, said upper plate being pivotable in said carrier at one end thereof, and means for automatically separating said plates upon movement of the carrier in the forward direction, comprising a U-shaped support member secured to the reader frame above the microform carrier, a toggle arm pivotally carried by the support member having a portion directed into continuous engagement with the upper glass plate, said upper plate having a hinge portion along one end thereof and having a recess therein on the side of the pivot opposite to said plate for entering by said toggle arm portion, and stop means on the toggle arm engageable with the support member for limiting rotation of the toggle arm after entering of said arm portion into the recess and bearing therein, upon forward movement of the microform carrier, for separating the plates and wherein the upper plate is retained open for insertion and removal of a microform.

10. In the reader of claim 9 including means urging the toggle arm into contact with the upper plate and rockably into said recess for bearing therein, upon forward movement of the microform carrier, to cause separation of the plates.

11. In the reader of claim 9 including a torsion spring connected with the support member and with the toggle arm for biasing said arm into entering said recess upon forward movement of the microform carrier.

12. In the reader of claim 9 wherein the carrier includes pins engageable by the hinge portion of the upper plate to combine with the stop means on the toggle arm to stop pivotal movement of the toggle arm in a position wherein the line of force exerted upon the toggle arm by the upper plate is directed along the center of the toggle arm pivotal connection for retaining the upper plate in the open position.

* * * * *